United States Patent
Senf, Jr. et al.

(10) Patent No.: US 10,337,767 B2
(45) Date of Patent: Jul. 2, 2019

(54) ADAPTIVE CONTROL OF MULTI-COMPARTMENT TRANSPORT REFRIGERATION SYSTEM

(71) Applicant: Carrier Corporation, Farmington, CT (US)

(72) Inventors: Raymond L. Senf, Jr., Central Square, NY (US); Wenhua Li, Manlius, NY (US)

(73) Assignee: CARRIER CORPORATION, Farmington, CT (US)

( * ) Notice: Subject to any disclaimer, the term of this patent is extended or adjusted under 35 U.S.C. 154(b) by 250 days.

(21) Appl. No.: 15/110,181

(22) PCT Filed: Jan. 7, 2015

(86) PCT No.: PCT/US2015/010437
§ 371 (c)(1),
(2) Date: Jul. 7, 2016

(87) PCT Pub. No.: WO2015/105845
PCT Pub. Date: Jul. 16, 2015

(65) Prior Publication Data
US 2016/0334142 A1 Nov. 17, 2016

Related U.S. Application Data

(60) Provisional application No. 61/924,941, filed on Jan. 8, 2014.

(51) Int. Cl.
*F25B 5/02* (2006.01)
*F25B 40/02* (2006.01)
(Continued)

(52) U.S. Cl.
CPC ............... *F25B 5/02* (2013.01); *F25B 40/02* (2013.01); *F25B 49/02* (2013.01); *F25D 11/003* (2013.01);
(Continued)

(58) Field of Classification Search
CPC ...... F25D 11/003; F25D 11/02; F25D 11/022; B60H 1/00014; B60H 1/00264;
(Continued)

(56) References Cited

U.S. PATENT DOCUMENTS

| | | | |
|---|---|---|---|
| 6,077,160 A | 6/2000 | Franaszek et al. | |
| 6,148,628 A | 11/2000 | Reason et al. | |

(Continued)

FOREIGN PATENT DOCUMENTS

| | | | | |
|---|---|---|---|---|
| EP | 2075516 A2 | * | 7/2009 | ............... F25B 5/02 |
| WO | 2013093991 A1 | | 6/2013 | |

OTHER PUBLICATIONS

International Search Report and Written Opinion for application PCT/US2015/010437, dated Mar. 19, 2015, 11 pages.

*Primary Examiner* — Christopher R Zerphey
*Assistant Examiner* — Schyler S Sanks
(74) *Attorney, Agent, or Firm* — Cantor Colburn LLP

(57) ABSTRACT

A multi-compartment transport refrigeration system (10) includes a first evaporator (40) having an first evaporator inlet coupled to a first evaporator expansion device (140) and a first evaporator outlet coupled to a compressor inlet path, the first evaporator for cooling a first compartment of a container at a first temperature; a second evaporator (609 having a second evaporator inlet coupled to a second evaporator expansion device (160) and a second evaporator outlet coupled to the compressor inlet path, the second evaporator for cooling a second compartment of the container at a second temperature greater than the first temperature; and a (Continued)

controller (550) for controlling the first evaporator expansion device in response to a first superheat setpoint and controlling the second evaporator expansion device in response to a second superheat setpoint, the controller adjusting the second superheat setpoint in response to the second temperature and the first temperature.

7 Claims, 3 Drawing Sheets

(51) Int. Cl.
    *F25B 49/02*     (2006.01)
    *F25D 11/00*     (2006.01)
    *F25B 27/00*     (2006.01)

(52) U.S. Cl.
    CPC ....... *F25B 27/00* (2013.01); *F25B 2341/0653* (2013.01); *F25B 2400/13* (2013.01); *F25B 2600/2513* (2013.01); *F25B 2700/21173* (2013.01); *Y02B 30/72* (2013.01)

(58) Field of Classification Search
    CPC ........... B60H 1/3232; F25B 2600/2513; F25B 2700/21172; F25B 2700/21175; F25B 2341/064
    See application file for complete search history.

(56) References Cited

U.S. PATENT DOCUMENTS

| | | |
|---|---|---|
| 7,617,691 B2 | 11/2009 | Street et al. |
| 7,698,904 B2 | 4/2010 | Bersch |
| 8,397,528 B2 | 3/2013 | Awwad et al. |
| 8,424,326 B2 | 4/2013 | Mitra et al. |
| 8,459,052 B2 | 6/2013 | Bush et al. |
| 8,561,425 B2 | 10/2013 | Mitra et al. |
| 2010/0107661 A1 | 5/2010 | Awwad et al. |
| 2010/0132399 A1 | 6/2010 | Mitra et al. |
| 2010/0251750 A1 | 10/2010 | Lifson et al. |
| 2011/0023534 A1* | 2/2011 | Kasahara ................ F25B 13/00 62/498 |
| 2011/0138886 A1 | 6/2011 | McDonald et al. |
| 2011/0174014 A1 | 7/2011 | Scarcella et al. |
| 2011/0209490 A1* | 9/2011 | Mijanovic .......... B60H 1/00885 62/190 |
| 2012/0318008 A1 | 12/2012 | Liu et al. |
| 2012/0318014 A1 | 12/2012 | Huff et al. |

* cited by examiner

ADAPTIVE CONTROL OF MULTI-COMPARTMENT TRANSPORT REFRIGERATION SYSTEM

BACKGROUND OF THE INVENTION

Embodiments relate generally to transport refrigeration systems, and more particularly to adaptive control of a multi-compartment transport refrigeration system.

The refrigerated container of a truck trailer requires a refrigeration unit for maintaining a desired temperature environment within the interior volume of the container. A wide variety of products, ranging for example, from freshly picked produce to deep frozen seafood, are commonly shipped in refrigerated truck trailers and other refrigerated freight containers. To facilitate shipment of a variety of products under different temperature conditions, some truck trailer containers are compartmentalized into two or more separate compartments, each of which typically having a door that opens directly to the exterior of the trailer. The container may be compartmentalized into a pair of side-by-side axially extending compartments, or into two or more back-to-back compartments, or a combination thereof.

Conventional transport refrigeration units used in connection with compartmentalized refrigerated containers of truck trailers include a refrigerant compressor, a condenser, a main evaporator and one or more remote evaporators connected via appropriate refrigerant lines in a closed refrigerant flow circuit. The refrigeration unit must have sufficient refrigeration capacity to maintain the product stored within the various compartments of the container at the particular desired compartment temperatures over a wide range of outdoor ambient temperatures and load conditions.

In addition to the afore-mentioned main evaporator, one or more remote evaporators, typically one for each additional compartment aft of the forward-most compartment, are provided to refrigerate the air or other gases within each of the separate aft compartments. The remote evaporators may be mounted to the ceiling of the respective compartments or mounted to one of the partition walls of the compartment, as desired. The remote evaporators are generally disposed in the refrigerant circulation circuit in parallel with the main evaporator.

Multiple temperature compartment transport refrigeration systems create significant control and refrigeration system complexity. Existing systems couple the main evaporator and remote evaporators to a common compressor suction plenum. When two or more compartments cool simultaneously in a system with a common suction plenum, the saturated evaporation temperature is shared between all compartments and evaporators. The resulting common evaporating temperature is dictated by coldest temperature compartment. Controls need to be put in place to prevent a perishable compartment from flooding or over feeding the frozen compartment. This is due to the fact that the perishable saturated evaporating temperature is significantly lower than perishable compartment air temperature. When saturation temperatures in the perishable compartment are low, the resulting sensed superheat for the perishable compartment is high. This causes the expansion device (e.g., mechanical or electrical) to open to 100%, which can result in flooding of the evaporator in the frozen compartment.

Existing systems employ pulsed cooling to prevent the perishable compartment capacity demand from flooding and diminishing all available capacity in the frozen or colder compartment. To combat this problem controls are put on a liquid solenoid valve to limit the available capacity to the perishable compartment. Typically a fixed pulse width modulation (PWM) cycle is used to control the liquid flow to the compartment that is trying to cool at the higher air temperature compartment when simultaneous cooling is required. This pulse width modulated approach and a high sensed superheat can cause a very dynamic power disturbance on the engine and introduce engine and control instability.

BRIEF DESCRIPTION OF THE INVENTION

According to one embodiment of the invention a multi-compartment transport refrigeration system includes a compressor having a suction port and a discharge port, the compressor suction port coupled to a compressor inlet path; a heat rejecting heat exchanger downstream of the compressor discharge port; a first evaporator expansion device downstream of the heat rejecting heat exchanger; a first evaporator having an first evaporator inlet coupled to the first evaporator expansion device and a first evaporator outlet coupled to the compressor inlet path, the first evaporator for cooling a first compartment of a container at a first temperature; a second evaporator expansion device downstream of the heat rejecting heat exchanger; a second evaporator having a second evaporator inlet coupled to the second evaporator expansion device and a second evaporator outlet coupled to the compressor inlet path, the second evaporator for cooling a second compartment of the container at a second temperature greater than the first temperature; and a controller for controlling the first evaporator expansion device in response to a first superheat setpoint and controlling the second evaporator expansion device in response to a second superheat setpoint, the controller adjusting the second superheat setpoint in response to the second temperature and the first temperature.

According to another embodiment of the invention, a method of operating a multi-compartment transport refrigeration system includes operating a first evaporator and first evaporator expansion device to cool a first compartment of a container at a first temperature, a first evaporator outlet coupled to a compressor inlet path; operating a second evaporator and second evaporator expansion device to cool a second compartment of a container at a second temperature greater than the first temperature, a second evaporator outlet coupled to the compressor inlet path; controlling the first evaporator expansion device in response to a first superheat setpoint and controlling the second evaporator expansion device in response to a second superheat setpoint, the controller adjusting the second superheat setpoint in response to the second temperature and the first temperature.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
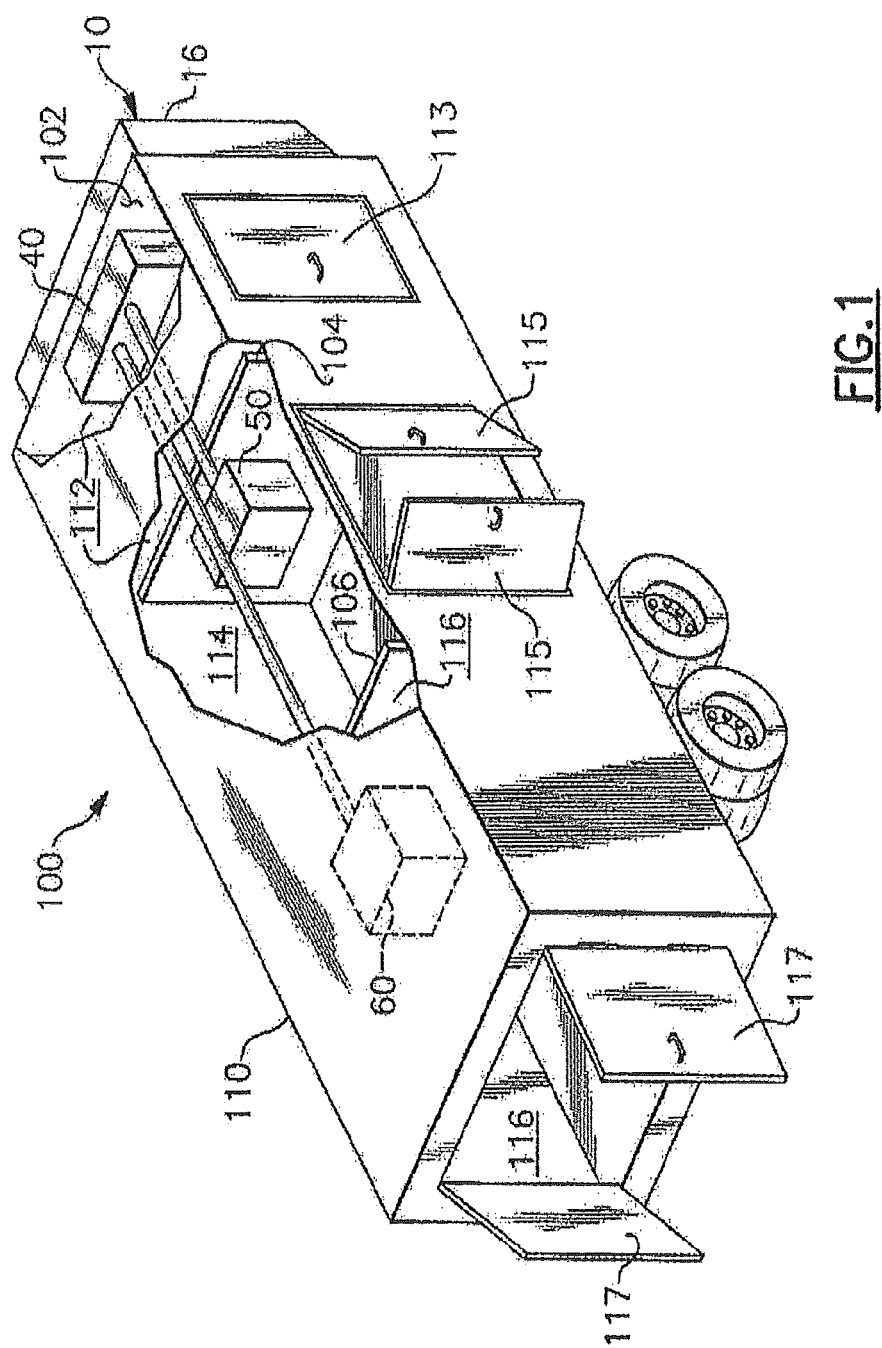
FIG. 1 is a perspective view, partly in section, of a refrigerated truck trailer having a compartmentalized container and equipped with a transport refrigeration unit having multiple evaporators in an exemplary embodiment.

Referring now to FIG. 1, there is shown a truck trailer 100 having a refrigerated container 110 subdivided, i.e., compartmentalized, by internal partition walls 104, 106 into a forward cargo compartment 112, a central cargo compartment 114 and an aft cargo compartment 116. The cargo compartments 112, 114 and 116 have access doors 113, 115 and 117, respectively, which open directly to the exterior of the truck trailer to facilitate loading of product into the respective cargo compartments 112, 114 and 116. The container 100 is equipped with a transport refrigeration system 10 for regulating and maintaining within each of the respective cargo compartments 112, 114 and 116 a desired storage temperature range selected for the product being shipped therein. Although embodiments will be described herein with reference to the three compartment, refrigerated container, illustrated in FIG. 1, it is to be understood that embodiments may also be used in connection with truck trailers having compartmentalized containers with the cargo compartments arranged otherwise, and also in connection with other refrigerated transport vessels, including for example refrigerated container of a truck, or a refrigerated freight container of compartmentalized design for transporting perishable product by ship, rail and/or road transport.

Transport refrigeration system 10 includes a main evaporator 40 and remote evaporators 50 and 60. Each of the evaporators 40, 50 and 60 may comprise a conventional finned tube coil heat exchanger. Each compartment includes a return air temperature sensor 41, 51 and 61 (FIG. 2), to measure the return air temperature from compartments 112, 114 and 116, respectively. The transport refrigeration system 10 is mounted as in conventional practice to an exterior wall of the truck trailer 100, for example the front wall 102 thereof, with the compressor 20 and the heat rejecting heat exchanger 117 (FIG. 2) disposed externally of the refrigerated container 110 in a housing 16.

Figure 2:
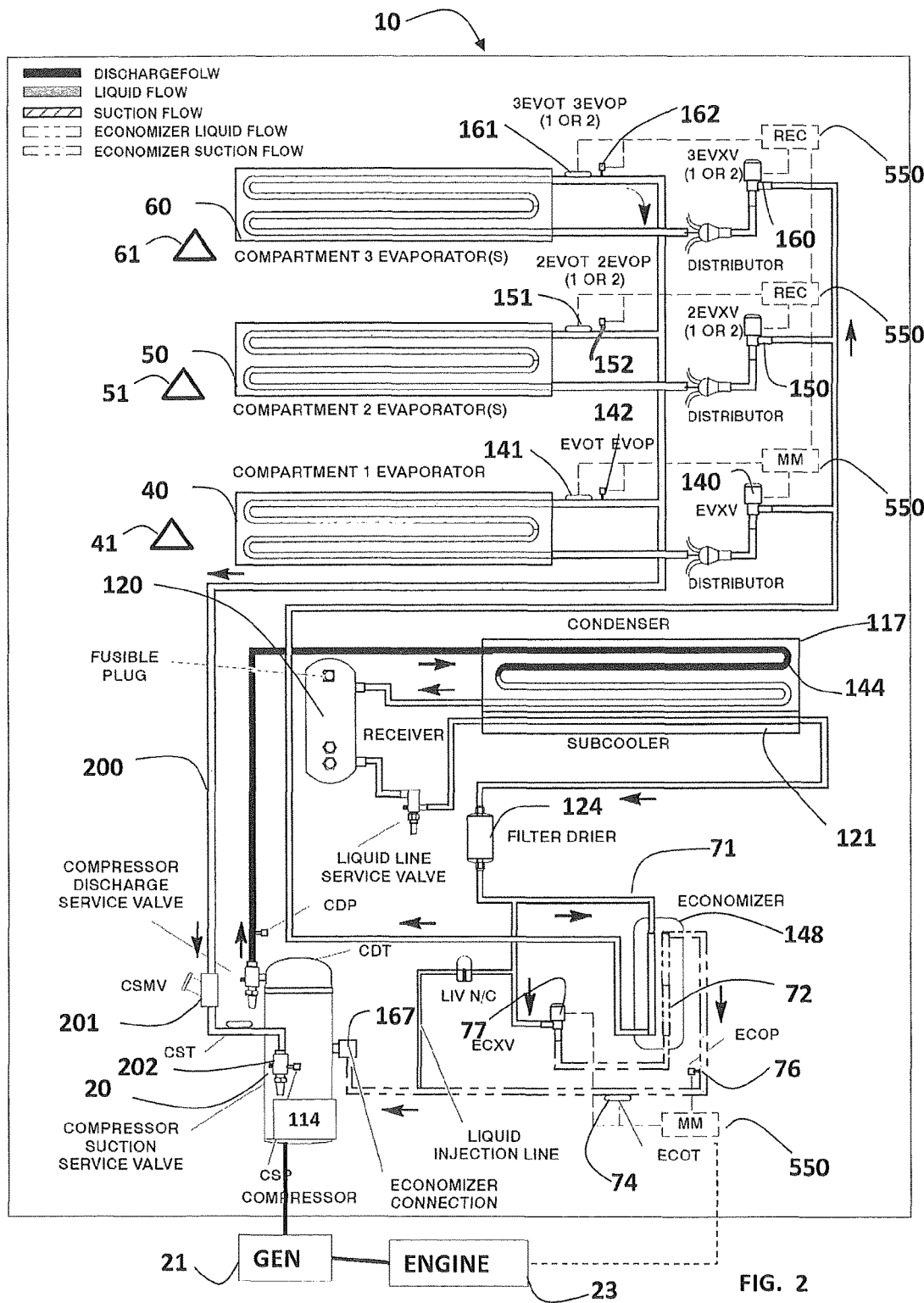
FIG. 2 is a schematic representation of a multiple evaporator transport refrigeration unit in an exemplary embodiment.

FIG. 2 is a schematic representation of the multiple evaporator transport refrigeration unit 10 in an exemplary embodiment. In the depicted embodiment, compressor 20 is a scroll compressor, however other compressors such as reciprocating or screw compressors are possible without limiting the scope of the disclosure. Compressor 20 includes a motor 114 which may be an integrated electric drive motor driven by a synchronous generator 21 operating at low speed (for example, 45 Hz) or high speed (for example, 65 Hz). Generator 21 may be driven by a diesel engine 23 of a vehicle that tows truck trailer 100. Alternatively, generator 21 may be driven by a stand-alone engine 23. In an exemplary embodiment, engine 23 a diesel engine, such as a four cylinder, 2200 cc displacement diesel engine which operates at a high speed (about 1950 RPM) or at low speed (about 1350 RPM).

High temperature, high pressure refrigerant vapor exits a discharge port of the compressor 20 then moves to a heat rejecting heat exchanger 117 (e.g., condenser or gas cooler), which includes a plurality of condenser coil fins and tubes 144, which receive air, typically blown by a heat rejecting heat exchanger fan (not shown). By removing latent heat through this step, the refrigerant condenses to a high pressure/high temperature liquid and flows to the receiver 120 that provides storage for excess liquid refrigerant during low temperature operation. From the receiver 120, the refrigerant flows to a subcooler 121, which increases the refrigerant subcooling. Subcooler 121 may be positioned adjacent heat rejecting heat exchanger 117, and cooled by air flow from the heat rejecting heat exchanger fan. A filter-drier 124 keeps the refrigerant clean and dry, and outlets refrigerant to a first refrigerant flow path 71 of an economizer heat exchanger 148, which increases the refrigerant subcooling. Economizer heat exchanger 148 may be a plate-type heat exchanger, providing refrigerant to refrigerant heat exchange between a first refrigerant flow path 71 and second refrigerant flow path 72.

From the first refrigerant flow path 71, refrigerant flows from the economizer heat exchanger 148 to a plurality of evaporator expansion devices 140, 150 and 160, connected in parallel with the first refrigerant flow path 71. Evaporator expansion devices 140, 150 and 160 are associated with evaporators 40, 50 and 60, respectively, to control ingress of refrigerant to the respective evaporators 40, 50 and 60. The evaporator expansion devices 140, 150 and 160 may be electronic evaporator expansion devices controlled by a controller 550. Controller 550 is shown as distributed for ease of illustration. It is understood that controller 550 may be a single device that controls the evaporator expansion devices 140, 150 and 160. Evaporator expansion device 140 is controlled by controller 550 in response to signals from a first evaporator outlet temperature sensor 141 and first evaporator outlet pressure sensor 142. Evaporator expansion device 150 is controlled by controller 550 in response to signals from a second evaporator outlet temperature sensor 151 and second evaporator outlet pressure sensor 152. Evaporator expansion device 160 is controlled by controller 550 in response to signals from a third evaporator outlet temperature sensor 161 and third evaporator outlet pressure sensor 162. Evaporator fans (not shown) draw or push air over the evaporators 40, 50 and 60 to condition the air in compartments 112, 114, and 116, respectively.

Refrigerant vapor from evaporators 40, 50 and 60 is coupled to a common compressor inlet path 200 coupled to a compressor suction port through a compressor suction modulation valve 201 and compressor suction service valve 202.

Refrigeration system 10 further includes a second refrigerant flow path 72 through the economizer heat exchanger 148. The second refrigerant flow path 72 is connected between the first refrigerant flow path 71 and an intermediate inlet port 167 of the compressor 20. The intermediate inlet port 167 is located at an intermediate location along a compression path between compressor suction port and compressor discharge port. An economizer expansion device 77 is positioned in the second refrigerant flow path 72, upstream of the economizer heat exchanger 148. The economizer expansion device 77 may be an electronic economizer expansion device controlled by controller 550. When the economizer is active, controller 550 controls economizer expansion device 77 to allow refrigerant to pass through the second refrigerant flow path 72, through economizer heat exchanger 148 and to the intermediate inlet port 167. The economizer expansion device 77 serves to expand and cool the refrigerant, which proceeds into the economizer counterflow heat exchanger 148, thereby sub-cooling the liquid refrigerant in the first refrigerant flow path 71 proceeding to evaporator expansion devices 140, 150 and 160.

As described in further detail herein, many of the points in the refrigerant vapor compression system 10 are monitored and controlled by a controller 550. Controller 550 may include a microprocessor and its associated memory. The memory of controller can contain operator or owner preselected, desired values for various operating parameters within the system 10 including, but not limited to, temperature set points for various locations within the system 10 or the container, pressure limits, current limits, engine speed limits, and any variety of other desired operating parameters or limits with the system 10. In an embodiment, controller 550 includes a microprocessor board that contains microprocessor and memory, an input/output (I/O) board, which contains an analog to digital converter which receives temperature inputs and pressure inputs from various points in the system, AC current inputs, DC current inputs, voltage inputs and humidity level inputs. In addition, I/O board includes drive circuits or field effect transistors ("FETs") and relays which receive signals or current from the controller 550 and in turn control various external or peripheral devices in the system 10, such as economizer expansion valve 77, for example.

In operation, controller 550 controls evaporator expansion devices 140, 150 and 160 based on sensed superheat at the outlet of each of the respective evaporators 40, 50 and 60. Controller 550 determines the sensed superheat for each evaporator 40, 50 and 60 based on the respective evaporator outlet temperature sensor and evaporator outlet pressure sensor. The sensed superheat is then compared to a superheat setpoint for each evaporator 40, 50 and 60 to control the evaporator expansion device associated with each evaporator 40, 50 and 60. As noted above, as evaporator 40, 50 and 60 are coupled to common suction plenum 200, when simultaneous cooling is required at two compartments at two differing compartment temperatures, the saturation temperature is the same across evaporators 40, 50 and 60. This causes the superheat in the higher temperature compartment to be high, causing a large discrepancy between the sensed superheat and the superheat setpoint for that compartment.

An example of the superheat error is provided for illustration. Compartment 40 contains frozen food (e.g., cooled to 0F) and compartment 60 contains perishable produce (e.g., cooled to 38 F). The common suction plenum 200 may cause the superheat in compartment 60 to be excessively high, causing controller 550 (e.g., executing a PID control process) to excessively open expansion device 160. This causes excess refrigerant to flow in evaporator 60, which can migrate to evaporator 40 along the common suction plenum, thereby flooding evaporator 40. The excess flow of refrigerant in evaporator 40 may lead to closing of evaporator expansion devices 140.

Embodiments discussed herein address this superheat error, by adjusting the superheat setpoint of the evaporator in the warmer compartment to be a function of the return air temperature of the warmer compartment and return air temperature of the cooler compartment. The return air temperature for each compartment is measured by return air temperature sensors 41, 51, and 61. In an exemplary embodiment, the superheat setpoint for the warmer compartment is adjusted as:

$$SHadj = SHorg + (RATwarm - RATcold)$$

where SHadj is the adjusted superheat setpoint for the warmer compartment, SHorg is the original superheat setpoint for the warmer compartment, RATwarm is the return air temperature for the warmer compartment and RATcold is the return air temperature for the colder compartment.

Adjusting the superheat setpoint for the warmer compartment prevents the superheat error (e.g., difference between the sensed superheat and the superheat setpoint) from becoming too large, resulting in overfeeding the frozen compartment.

Figure 3:
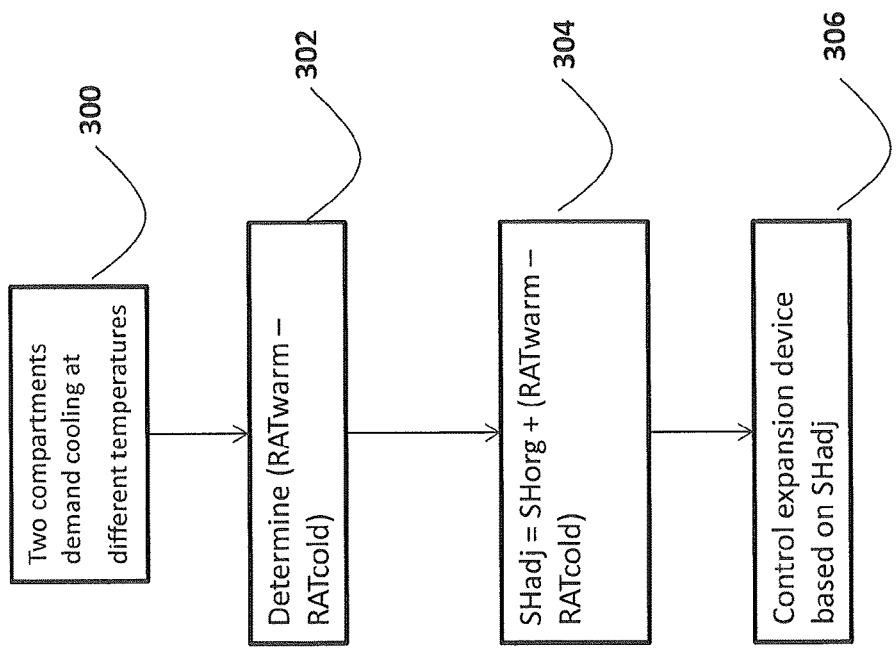
FIG. 3 is a flowchart of a method for controlling the multi-compartment refrigeration system in an exemplary embodiment.

FIG. 3 is a flowchart of a method for controlling the multi-compartment refrigeration system in an exemplary embodiment. The process begins at 300 where two compartments of the system demand cooling at different temperatures. At 302, controller 550 determines a temperature difference between the return air temperature of the warmer compartment, RATwarm, and the return air temperature of the cooler compartment, RATcold. At 304, the original superheat setpoint, SHorg, for the warmer compartment is added to the temperature difference between the return air temperature of the warmer compartment, RATwarm, and the return air temperature of the cooler compartment, RATcold, to define an adjusted superheat setpoint, SHadj, for the warmer compartment. At 306, expansion device for the warmer compartment is controlled using the adjusted superheat setpoint, SHadj.

Embodiments discussed herein lead to better system stability and less chance of engine disturbances (stalls). The total system efficiency will improve because less saturation flooding of the frozen evaporator will occur from excessive flow of the perishable compartment. Additionally, expansion device life expectancy will improve due to reduced pulsing. Another benefit is reduced transient flooding and slugging to the compressor.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A multi-compartment transport refrigeration system comprising:
   a compressor having a suction port and a discharge port, the compressor suction port coupled to a compressor inlet path;
   a heat rejecting heat exchanger downstream of the compressor discharge port;
   a first evaporator expansion device downstream of the heat rejecting heat exchanger;
   a first evaporator having a first evaporator inlet coupled to the first evaporator expansion device and a first evaporator outlet coupled to the compressor inlet path, the first evaporator associated with a first compartment of a container, the first compartment cooled to a first temperature;
   a second evaporator expansion device downstream of the heat rejecting heat exchanger;
   a second evaporator having a second evaporator inlet coupled to the second evaporator expansion device and a second evaporator outlet coupled to the compressor inlet path, the second evaporator associated with a second compartment of the container, the second compartment cooled to a second temperature greater than the first temperature; and a controller for controlling the first evaporator expansion device in response to a first superheat setpoint and controlling the second evaporator expansion device in response to a second superheat setpoint, the controller adjusting the second superheat setpoint in response to the second temperature and the first temperature;

wherein the controller adjusts the second superheat setpoint by determining an adjusted second superheat setpoint equal to an original second superheat setpoint plus a difference between the second temperature and the first temperature.

2. The multi-compartment transport refrigeration system of claim 1 further comprising:

a first return air temperature sensor to generate the first temperature; and a second return air temperature sensor to generate the second temperature.

3. The multi-compartment transport refrigeration system of claim 1 wherein:

the controller controls the second evaporator expansion device in response to the second superheat setpoint and a sensed second superheat at the second evaporator outlet.

4. A method of operating a multi-compartment transport refrigeration system, the method comprising:

operating a first evaporator and first evaporator expansion device to cool a first compartment of a container to a first temperature, a first evaporator outlet coupled to a compressor inlet path;

operating a second evaporator and second evaporator expansion device to cool a second compartment of the container to a second temperature greater than the first temperature, a second evaporator outlet coupled to the compressor inlet path;

controlling the first evaporator expansion device in response to a first superheat setpoint and controlling the second evaporator expansion device in response to a second superheat setpoint, the controller adjusting the second superheat setpoint in response to the second temperature and the first temperature;

wherein adjusting the second superheat setpoint includes determining an adjusted second superheat setpoint equal to an original second superheat setpoint plus a difference between the second temperature and the first temperature.

5. The method of claim 4 wherein:

controlling the second evaporator expansion device includes determining an error between the second superheat setpoint and a sensed second superheat at the second evaporator outlet.

6. The method of claim 4 wherein:

controlling the second evaporator expansion device is in response to the second superheat setpoint and a sensed second superheat at the second evaporator outlet.

7. The multi-compartment transport refrigeration system of claim 1 wherein:

the compressor comprises a motor;

the system further comprising a generator configured to power the motor.

* * * * *